(No Model.)
H. W. PEACE.
SAW.
No. 298,115. Patented May 6, 1884.
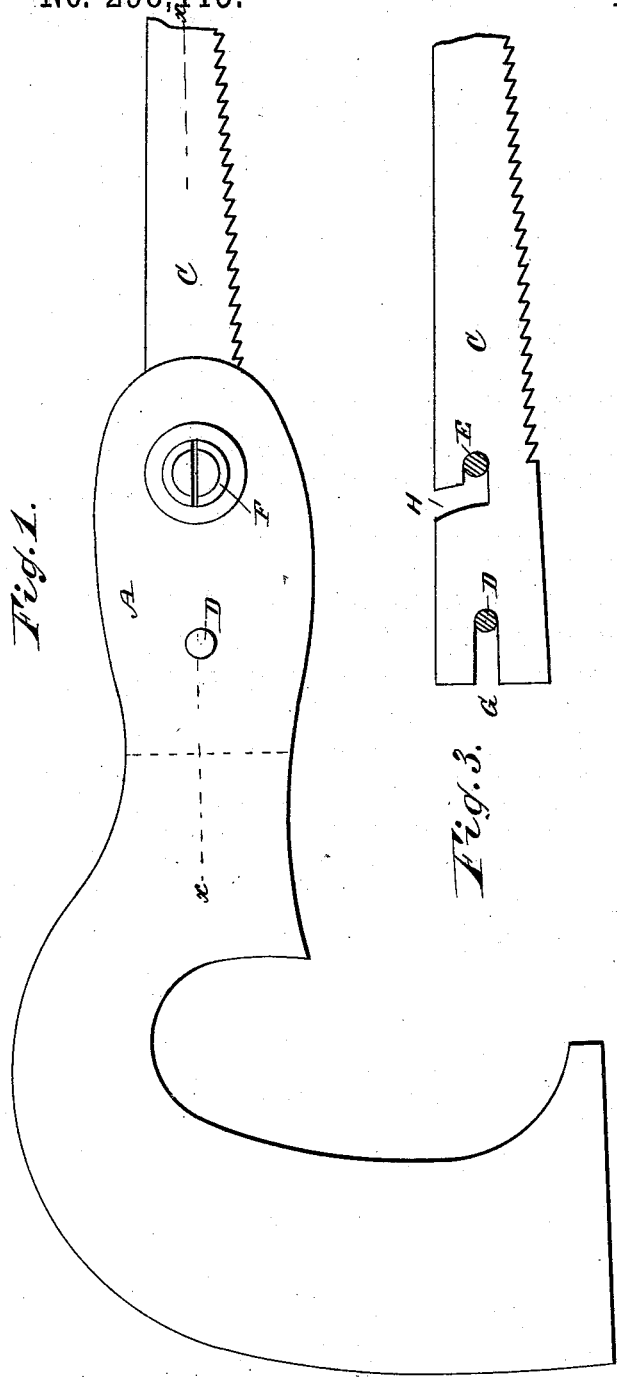
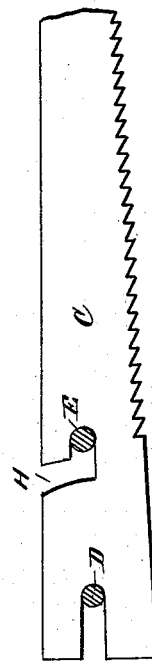
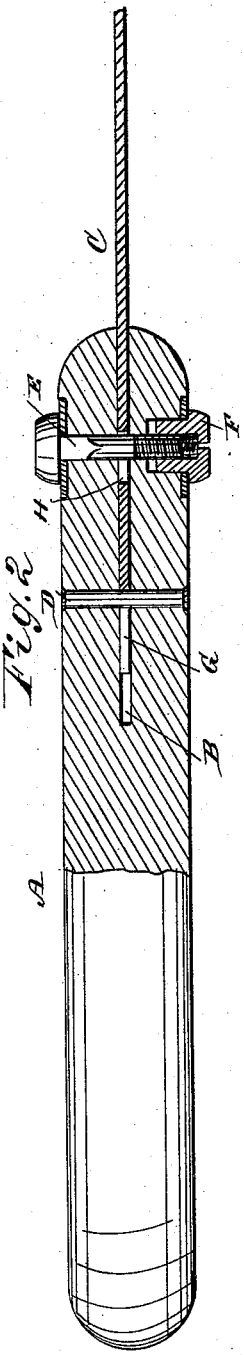
WITNESSES:
Theo. G. Hoster
C. Sedgwick
INVENTOR:
H. W. Peace
BY Munn & Co
ATTORNEYS.

UNITED STATES PATENT OFFICE.

HARVEY W. PEACE, OF BROOKLYN, NEW YORK, ASSIGNOR TO THE HARVEY W. PEACE COMPANY, OF SAME PLACE.

SAW.

SPECIFICATION forming part of Letters Patent No. 298,115, dated May 6, 1884.

Application filed February 14, 1884. (No model.)

*To all whom it may concern:*

Be it known that I, HARVEY W. PEACE, of Brooklyn, Kings county, New York, have invented a new and Improved Saw, of which the following is a full, clear, and exact description.

The object of my invention is to provide certain new and useful improvements in saws, whereby the blade can be detached very readily from the handle on the same, thus facilitating the interchanging of the blades.

The invention consists in the construction and arrangement of parts, as will be hereinafter fully described, and specifically set forth in the claim.

Reference is to be had to the accompanying drawings, forming part of this specification, in which similar letters of reference indicate corresponding parts in all the figures.

Figure 1 is a longitudinal elevation of my improved saw, part being broken away; Fig. 2, a longitudinal sectional view of the same on the line $x\,x$, Fig. 1; and Fig. 3 is a side view of the butt-end and of the blade.

The saw-handle A is provided with the usual slit, B, for receiving the butt-end of the saw-blade C. The handle is provided with a transverse pin, D, and a short distance from the pin D, and toward the end of the handle, with a screw, E, provided with a nut, F. The saw-blade is provided in its butt-end with a longitudinal slot, G, and in the back edge, a short distance from the butt-end, with an L-shaped slot, H, which extends from the edge toward the middle of the blade, and then toward the free or pointed end of the same.

To secure the blade in the handle, the butt-end of the blade is passed into the slot B in such a manner that the pin D passes partly into the slot G, and the screw E passes into the transverse part of the slot H, and then the blade is moved in the direction of its length until the pin D and the screw E strike against the ends of the slots G H. The screw E is then drawn up tightly to clamp the blade between the two sides of the handle. The blade is held firmly and securely in the handle, and cannot be drawn out as long as the screw E is drawn up tight. When necessary, the blade can be removed readily after loosening the screw E, and a new blade can be secured in the handle, thus making one handle available for a number of different blades.

I am aware that a tool has been provided with a beveled shank, a longitudinal slot at said beveled portion for a pivoted latch on the handle to enter, and with an L-shaped slot on the upper side of the shank to engage a fixed pin in the handle, the longitudinal arm of said slot extending toward the end of the shank; also, that a saw-blade has been provided with a longitudinal slot in its shank, enlarged at the base for being locked in place in the handle by screws of different diameters; also, that the shank of a saw has been slotted on its under and upper edges to form a shank of substantially S-shaped contour for engaging set-screws in the handle; and I do not claim any such constructions as of my invention.

Having thus described my invention, I claim as new and desire to secure by Letters Patent—

The combination of the handle provided with slot B, fixed pin D, and clamping-bolt E in front of said pin, with the blade provided with an open longitudinal slot, G, in its rear edge, as shown, and with an open L-shaped slot extending from the upper side downward to the plane of the slot D, and then toward the point of the blade, substantially as set forth.

HARVEY W. PEACE.

Witnesses:
SILAS C. BROWN,
JOHN H. HORN.